(12) United States Patent
Watanabe

(10) Patent No.: US 8,830,257 B2
(45) Date of Patent: Sep. 9, 2014

(54) IMAGE DISPLAYING APPARATUS

(75) Inventor: Mihoko Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 295 days.

(21) Appl. No.: 13/496,830

(22) PCT Filed: Sep. 8, 2010

(86) PCT No.: PCT/JP2010/065373
§ 371 (c)(1),
(2), (4) Date: Apr. 5, 2012

(87) PCT Pub. No.: WO2011/033972
PCT Pub. Date: Mar. 24, 2011

(65) Prior Publication Data
US 2012/0182311 A1    Jul. 19, 2012

(30) Foreign Application Priority Data

Sep. 18, 2009 (JP) ................................. 2009-217423

(51) Int. Cl.
| | |
|---|---|
| G09G 5/00 | (2006.01) |
| G09G 5/02 | (2006.01) |
| G09G 5/10 | (2006.01) |
| H04N 7/14 | (2006.01) |
| H04N 5/228 | (2006.01) |
| H04N 11/04 | (2006.01) |
| H04N 9/64 | (2006.01) |
| H04N 11/02 | (2006.01) |
| H04N 7/01 | (2006.01) |
| G09G 3/20 | (2006.01) |

(52) U.S. Cl.
CPC ....... *H04N 7/013* (2013.01); *G09G 2340/0435* (2013.01); *G09G 2360/16* (2013.01); *G09G 3/20* (2013.01); *G09G 2320/106* (2013.01); *G09G 2320/0257* (2013.01); *G09G 2340/16* (2013.01)
USPC ........... 345/606; 345/581; 345/589; 345/690; 348/14.14; 348/14.15; 348/208.4; 348/416.1; 348/699; 375/240.16

(58) Field of Classification Search
USPC .......................... 345/581, 589, 606, 204, 690; 348/14.14, 14.15, 208.4, 208.13, 348/220.1, 402.1, 407.1, 413, 415, 416.1, 348/425.2, 430.1, 431, 452, 456, 699–701; 375/240.16, 240.22, 240.26; 382/253, 382/254, 276

See application file for complete search history.

(56) References Cited

U.S. PATENT DOCUMENTS

| | | | |
|---|---|---|---|
| 2008/0181312 A1 | 7/2008 | Kimura | |
| 2008/0231745 A1 | 9/2008 | Ogino et al. | |
| 2009/0059074 A1 | 3/2009 | Suematsu et al. | |
| 2009/0231314 A1 | 9/2009 | Hanaoka et al. | |
| 2010/0026898 A1* | 2/2010 | Ueno et al. .................... | 348/607 |
| 2010/0085478 A1 | 4/2010 | Yamamoto et al. | |
| 2010/0214473 A1* | 8/2010 | Kanai ........................... | 348/452 |

FOREIGN PATENT DOCUMENTS

| | | |
|---|---|---|
| EP | 1404130 A1 | 3/2004 |
| EP | 2066118 A2 | 6/2009 |
| JP | 8-149421 A | 6/1996 |
| JP | 3121519 B2 | 1/2001 |
| JP | 2007-267360 A | 10/2007 |
| JP | 2008-107753 A | 6/2008 |
| JP | 2008-236098 A | 10/2008 |
| JP | 2008-306330 A | 12/2008 |

OTHER PUBLICATIONS

Supplementary European Search Report, dated Feb. 11, 2013 for European Application No. 10817085.3.

* cited by examiner

*Primary Examiner* — Wesner Sajous
(74) *Attorney, Agent, or Firm* — Birch, Stewart, Kolasch & Birch, LLP

(57) ABSTRACT

An image displaying apparatus executes FRC process, wherein image deterioration in a boundary portion between a still image display area and its periphery is prevented. When the magnitude of the motion vector of an object in the periphery of a still image display area is less than a predetermined threshold value, an interpolation frame generation portion defines the pixel values of a still image display area and its periphery of the frame #n as the interpolation pixel values of a still image display area and its periphery of the interpolation frame #I.
When the magnitude of the motion vector of the object is equal to or greater than the predetermined threshold value, the pixel values of the still image display area and its periphery of the frame n+1 are defined as the interpolated pixel values of the still image display area and its periphery of the interpolation frame #I.

2 Claims, 6 Drawing Sheets

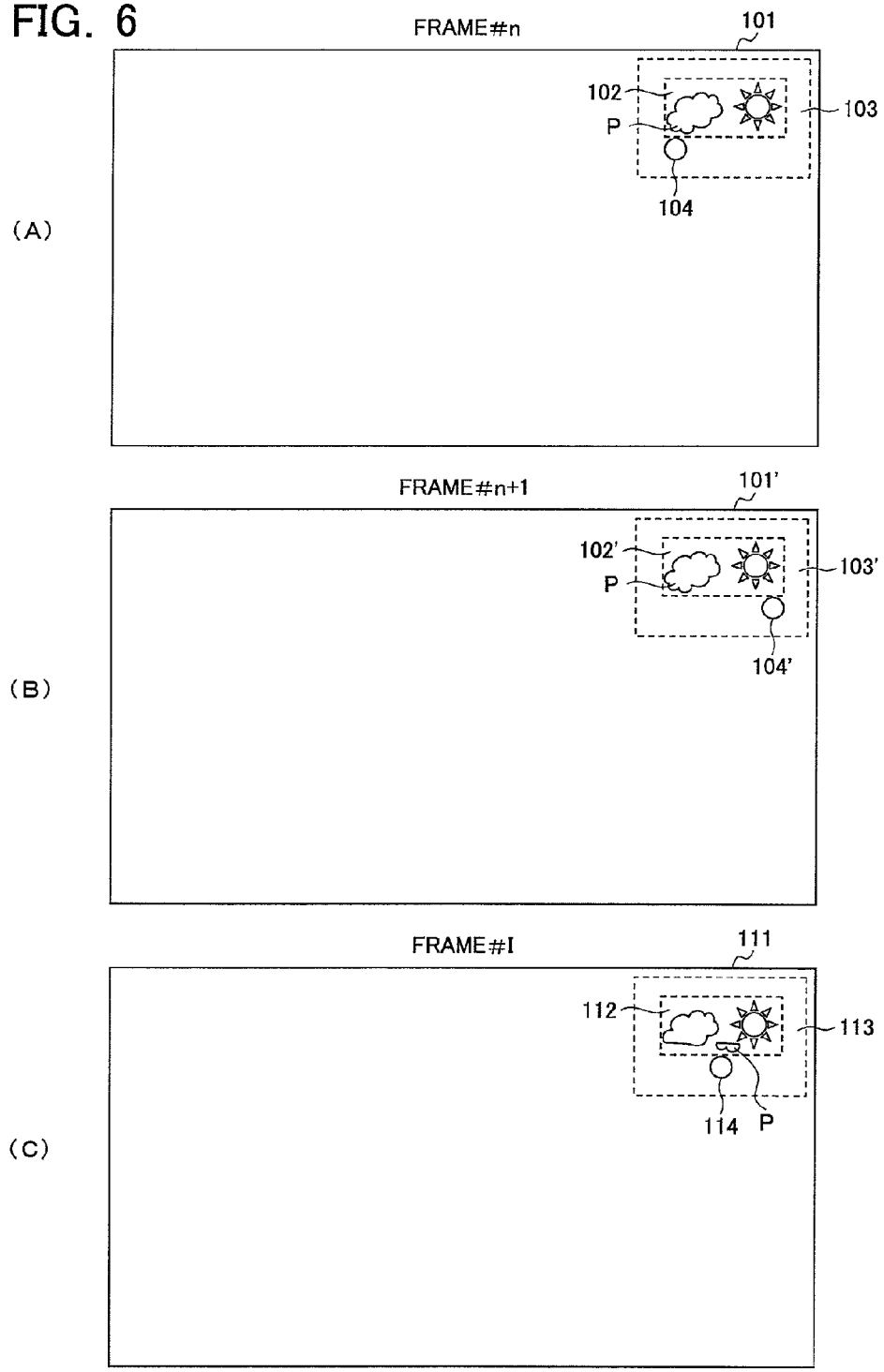

# IMAGE DISPLAYING APPARATUS

TECHNICAL FIELD

The present invention relates to an image displaying apparatus executing a frame rate conversion process and particularly to an image displaying apparatus preventing image deterioration when the frame rate conversion process is executed.

BACKGROUND ART

To suppress a sense of afterimage and improve image quality during display of a moving image, an image displaying apparatus including a liquid crystal panel executes a frame rate conversion (hereinafter referred to as FRC) process that increases a frame rate (frame number) per unit time of image signal to increase resolution in the time direction.

The FRC process is executed as a process of detecting a motion vector of an object from a difference among a plurality of (typically, two) frames included in an image signal, and creating and inserting an interpolation frame (also referred to as an interpolation frame) between the frames.

For an image displaying apparatus executing such an FRC process, various techniques have been proposed to prevent image breakdown or image deterioration (also referred to as image quality deterioration) due to the execution of the FRC process.

For example, Patent Document 1 discloses an image display device including a technical means that accurately detects a motion vector of a telop portion moving vertically or horizontally relative to a screen to prevent image deterioration in the telop portion.

Patent Document 2 discloses an image processing device including a technical means that highly precisely detects a motion vector in image with a plurality of moving objects intersecting one another to suppress breakdown of overall image.

PRIOR ART DOCUMENTS

Patent Document

Patent Document 1: Japanese Laid-Open Patent Publication No. 2008-107753
Patent Document 2: Japanese Laid-Open Patent Publication No. 2008-236098

SUMMARY OF THE INVENTION

Problem to be Solved by the Invention

If an FRC process is executed for an image frame (hereinafter referred to as a frame) including still image remaining still for a certain period of time such as weather information, time information, channel information, OSD, and captions, image deterioration may occur in a still image display area displaying the still image. Particularly, image deterioration tends to occur near the boundary between the still image display area and its periphery.

FIG. 6 is a diagram for explaining such image deterioration; FIG. 6(A) is a schematic of image of a frame #n; FIG. 6(B) is a schematic of image of a frame #n+1; and FIG. 6(C) is a schematic of image of an interpolation frame #I generated by the execution of the FRC process.

In FIG. 6(A), 101 denotes the image of the frame #n; 102 denotes an area displaying a predetermined still image (hereinafter referred to as a still image display area); 103 denotes a periphery of the still image display area 102; and an object 104 is displayed at the bottom left corner of the still image display area 102.

In FIG. 6(B), 101' denotes the image of the frame #n+1; 102' denotes a still image display area; 103' denotes a periphery of the still image display area 102'; and an object 104' is displayed at the bottom right corner of the still image display area 102'. A reference letter P denotes a portion of the image displayed in the still image display area. As can be seen from FIG. 6, the object 104 moves to the right of a screen.

An example of executing the FRC process, where a motion vector of the object 104 is detected and the interpolation frame #I between the frame #n and the frame #n+1 is generated, is depicted in FIG. 6(C). In FIG. 6(C), 111 denotes the image of the frame #I; 112 denotes a still image display area; 113 denotes a periphery of the still image display area 112; and 114 denotes an object.

While the object 104 of the frame #n is displayed as the object 114 at the bottom center of the still image display area 112, the portion P of the still image displayed in the still image display area 102 of the frame #n may be dragged by the motion of the object 114 and displayed above the object 114, which deteriorates the image of the still image display area 112.

One of the factors causing such image deterioration is that, particularly, in a boundary portion between the still image display area and its periphery, the same process as the FRC process (a motion vector detection process and an interpolation process) executed for a moving object displayed on the periphery is executed for a portion of still image displayed in the still image display area. In other words, the FRC process is executed for a portion of the still image by being dragged by the motion of the moving object displayed near the portion.

The technique disclosed in Patent Document 1 is intended to accurately detect a motion vector of a moving telop portion to prevent image deterioration in the moving telop portion; the technique disclosed in Patent Document 2 is intended to highly precisely detect a motion vector in image with a plurality of moving objects intersecting one another to suppress breakdown of overall image; and the both techniques cannot prevent the image deterioration in the boundary portion between the still image display area and its periphery described above.

The present invention was conceived in view of the situations and it is therefore an object of the present invention to provide an image displaying apparatus executing an FRC process and preventing image deterioration in a boundary portion between a still image display area and its periphery.

Means for Solving the Problem

A first technical means is an image displaying apparatus having a motion vector detecting portion detecting a motion vector from a difference between a first image frame and a second image frame sequentially input and an interpolation frame generating portion generating an interpolation frame inserted between the first image frame and the second image frame based on the detected motion vector, the apparatus comprising a still image display area detecting portion that detects an area displaying a predetermined still image in the first image frame and the second image frame, the interpolation frame generating portion defining pixel values of a still image display area and its periphery of the first image frame as interpolation pixel values of a still image display area and its periphery of the interpolation frame if a magnitude of the motion vector on the periphery of the still image display area detected by the motion vector detecting portion is less than a predetermined threshold value, the interpolation frame generating portion defining pixel values of a still image display area and its periphery of the second image frame as the interpolation pixel values of the still image display area and its periphery of the interpolation frame if the magnitude of the motion vector is equal to or greater than the predetermined threshold value.

A second technical means is the image displaying apparatus of the first technical means, wherein if the magnitude of the motion vector on the periphery of the still image display area detected by the motion vector detecting portion is less than a predetermined threshold value, the interpolation frame generating portion defines the pixel values of the still image display area and its periphery of the first image frame a's the interpolation pixel values of the still image display area and its periphery of the interpolation frame, and wherein if the magnitude of the motion vector is equal to or greater than the predetermined threshold value, the interpolation frame generating portion generates the interpolation pixel values of the still image display area and its periphery of the interpolation frame based on the magnitude of the motion vector and blurs the interpolation pixels.

Effect of the Invention

According to the present invention, the image displaying apparatus executing the FRC process can prevent the image deterioration in the boundary portion between the still image display area and its periphery and, therefore, a viewer can comfortably view the image.

BRIEF DESCRIPTION OF THE DRAWINGS

FIG. 6 is a diagram for explaining image deterioration in a conventional image displaying apparatus.

MODES FOR CARRYING OUT THE INVENTION

First Embodiment

Figure 1:
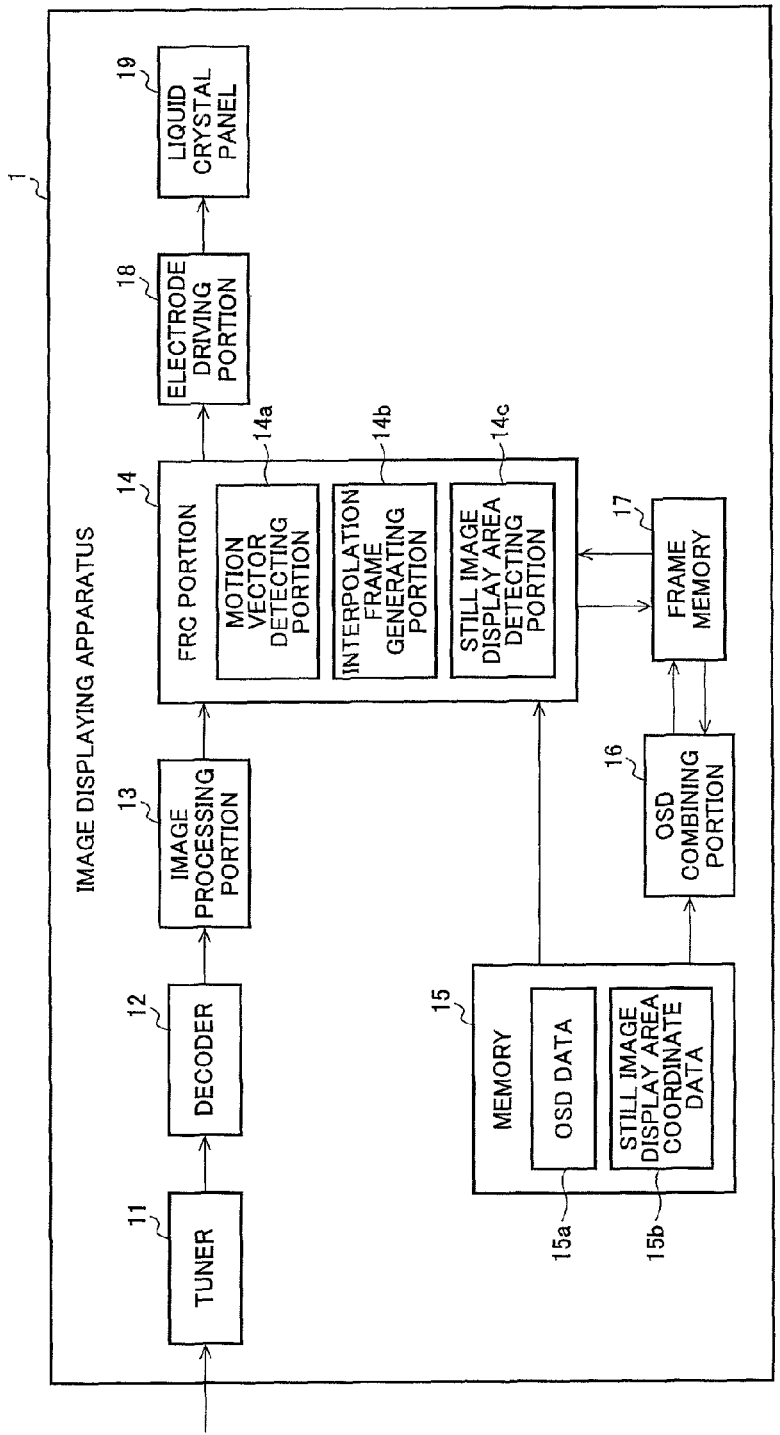
FIG. 1 is a functional block diagram of an image displaying apparatus according to the present invention.

FIG. 1 is a functional block diagram of an image displaying apparatus according to the present invention. An image displaying apparatus 1 comprises a tuner 11, a decoder 12, an image processing portion 13, an FRC portion 14, a memory 15, an OSD combining portion 16, a frame memory 17, an electrode driving portion 18, and a liquid crystal panel 19.

The tuner 11 selects a desired channel from digital broadcast signals received by an antenna (not depicted) and outputs a digital reception signal of the selected channel to the decoder 12. The decoder 12 decodes the encoded digital reception signal to generate an image signal and outputs the generated image signal to the image processing portion 13. The image processing portion 13 performs image quality corrections such as γ-correction and color correction for the image signal input from the decoder 12 and outputs the image signal subjected to the image quality corrections to the FRC portion 14.

The FRC portion 14 extracts two consecutive frames (original frames) from the image signal input from the image processing portion 13 and outputs the two extracted frames to the frame memory 17. The FRC portion 14 generates an interpolation frame based on the two frames and interpolates the interpolation frame between the two frames to convert the frame number of the input image signal. The FRC portion 14 outputs the frames stored in the frame memory 17 to the electrode driving portion 18.

A motion vector detecting portion 14a of the FRC portion 14 detects a motion vector of image (an object) between two frames from a difference between two frames sequentially input to the frame memory 17.

An interpolation frame generating portion 14b generates an interpolation frame inserted between two frames based on the motion vector detected by the motion vector detecting portion 14a.

A still image display area detecting portion 14c detects a still image display area in a frame. The detection will be described in detail later with reference to FIG. 3.

The memory 15 stores information such as OSD data 15a made up of bit map data etc., and still image display area coordinate data 15b. The still image display area coordinate data 15b will be described in detail later with reference to FIG. 3.

The OSD combining portion 16 combines the OSD data 15a in the memory 15 with original frames in the frame memory 17 (also referred to as α blending).

The frame memory 17 has a storage capacity of storing at least three frames, which are two original frames and an interpolation frame. The electrode driving portion 18 drives scanning electrodes and data electrodes of the liquid crystal panel 19 based on the frames in the frame memory 17. The liquid crystal panel 19 is an active-matrix liquid crystal panel having a liquid crystal layer and electrodes applying scanning signals and data signals to the liquid crystal layer. An organic EL panel, for example, can be utilized in addition to the liquid crystal panel.

Details of the FRC process of the present invention will then be described.

<Detection of Motion Vector>

When the FRC portion 14 executes the FRC process, the motion vector detecting portion 14a of the FRC portion 14 detects a motion vector of image.

Figure 2:
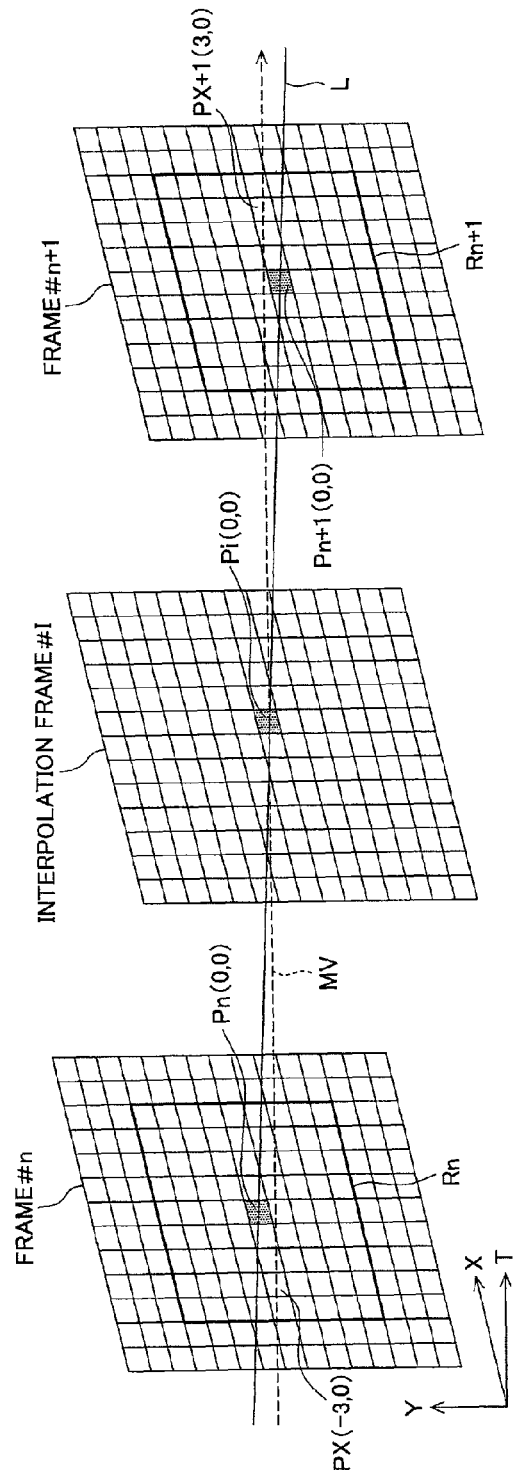
FIG. 2 is a diagram for explaining an example of a motion vector detecting method.

FIG. 2 is a diagram for explaining an example of a motion vector detecting method.

In FIG. 2, a frame #n (first frame) and a frame #n+1 (second frame) represent frames (original frames) sequentially input to the frame memory 17, and an interpolation frame #I represents a frame generated by the execution of the FRC process based on the frame #n and the frame #n+1. X, Y, and T denote a horizontal direction of the frames, a vertical direction of the frames, and time, respectively. Coordinate values of an interpolation pixel $P_i$ to be interpolated in the interpolation frame #I are assumed to be (0, 0).

The motion vector detecting portion 14a defines a retrieval area $R_n$ and a retrieval area $R_{n+1}$, which are retrieval areas of motion vectors, for the frame #n and the frame #n+1. The retrieval area $R_n$ of the frame #n is assumed to have a size of nine pixels along the X-axis by nine pixels along the Y-axis around a pixel $P_n$ of the frame #n located at the same spatial position as the interpolation pixel $P_i$ of the interpolation frame #I (see a straight line L). As is the case with the frame #n, the retrieval area $R_{n+1}$ of the frame #n+1 is assumed to have a size of nine pixels along the X-axis by nine pixels along the Y-axis around a pixel $P_{n+1}$ of the frame #n+1 located at the same spatial position as the interpolation pixel $P_i$. The coordinates of the pixel $P_n$ and the pixel $P_{n+1}$ are (0, 0).

The motion vector detecting portion 14a then sets a straight line passing through the retrieval area $R_n$ of the frame #n and the retrieval area $R_{n+1}$ of the frame #n+1, centering on the interpolation pixel $P_i$ of the interpolation frame #I. An example of this straight line is a straight line connecting a pixel $P_x$ (−3, 0) on the left center of the retrieval area $R_n$ and a pixel $P_{x+1}$ (3, 0) on the right center of the retrieval area $R_{n+1}$. Such a straight line is set for all the pixels in the retrieval area $R_n$ and the retrieval area $R_{+1}$. Since the number of pixels is 9×9=81 in each of the retrieval area $R_n$ and the retrieval area $R_{n+1}$ in this case, 81 straight lines are set as straight lines passing through the interpolation pixel $P_i$.

For each of the 81 straight lines, a difference is calculated between a pixel value (also referred to as a luminance value) of a pixel in the retrieval area $R_n$ and a pixel value of a pixel in the retrieval area $R_{n+1}$ through which each straight line passes. A straight line having a pair of pixels with the smallest difference is defined as a motion vector of the pixel in the frame #n.

It is assumed that a pair of the pixel $P_x$ in the retrieval area $R_n$ and the pixel $P_{x+1}$ in the retrieval area $R_{n+1}$ has the smallest difference. Therefore, the motion vector detecting portion 14a detects the straight line connecting the pixel $P_x$ of the frame #n, the pixel $P_i$ of the frame #I, and the pixel $P_{x+1}$ of the frame #n+1 as a motion vector MV of the pixel $P_x$. Therefore, the pixel $P_x$ of the frame #n passes through the pixel at the same position as the interpolation pixel $P_i$ of the interpolation frame #I and moves to the pixel $P_{x+1}$ in the frame #n+1 in accordance with the direction pointed by the motion vector MV. The motion vector detecting portion 14a detects the magnitude of the motion vector MV at the same time. In this case, a pixel distance between the pixel $P_x$ and the pixel $P_{x+1}$ when the frame #n and the frame #n+1 are disposed on the same plane, i.e., 6 (=3−(−3)), is detected as the magnitude of the motion vector MV.

Various methods such as a conventionally proposed gradient method are also usable for the detection of the motion vector.

The interpolation frame generating portion 14b calculates (generates) the pixel value of the interpolation pixel $P_i$ by using the motion vector MV. For example, the pixel value of the interpolation pixel $P_i$ is calculated by calculating an average value of the pixel value of the pixel $P_x$ in the frame #n and the pixel value of the pixel $P_{x+1}$ in the frame #n+1. This interpolation pixel generating process is executed for all the pixels of the interpolation frame #I to generate the interpolation frame #I.

If frame rate of input image is 60 Hz and the interpolation frame #I is inserted between the frames #n and #n+1, it is possible to convert the frame rate into 120 Hz. The same applies to the case of converting the frame rate into 240 Hz. A repeated frame of image signal of the 2-3 pull-down mode can be replaced with an interpolation frame to smooth motions while maintaining a frame rate of 60 Hz (also referred to as a dejudder function).

An interpolation frame generation process of the present invention will be described with reference to FIG. 3.

FIG. 3(A) is a schematic of image of the frame #n; FIG. 3(B) is a schematic of image of the frame #n+1; and FIG. 3(C) is a schematic of image of the interpolation frame #I.

In FIG. 3(A), 51 denotes the image of the frame #n; 52 denotes an area displaying predetermined still image (hereinafter referred to as a still image display area); 53 denotes a periphery of the still image display area 52; and an object 54 is displayed at the bottom left corner of the still image display area 52.

In FIG. 3(B), 51' denotes the image of the frame #n+1: 52' denotes a still image display area: 53' denotes a periphery of the still image display area 52'; and an object 54' is displayed at the bottom right corner of the still image display area 52'.

The still image display area (52, 52') represents an area displaying image remaining still for a certain period of time, such as weather information, time information, channel information, OSD image, and character information (telop), displayed at the upper right corner or the upper left corner of image.

In the interpolation frame generation process of the present invention, the still image display area detecting portion 14c of the present invention detects the still image display area 52 of the frame #n. Similarly, the still image display area detecting portion 14c detects the still image display area 52' of the frame #n+1. Conventionally proposed various techniques are usable for this detecting method. For example, if a morning news program is viewed, weather information, time information, etc., are likely to be displayed in the upper right corner portion and the upper left corner portion of image and, therefore, these portions may be considered as the still image display areas. A type of a program being viewed can be acquired from EPG data. The coordinate values of the still image display area are stored in the memory 15 as the still image display area coordinate data 15b. Additionally, if the OSD combining portion 16 is operating, i.e., the OSD display is performed, the still image display area may be detected based on area coordinate values of a portion in a frame with which the OSD is combined.

After the still image display area detecting portion 14c detects the still image display area, the motion vector detecting portion 14a of the present invention detects a motion vector of the periphery 53 of the still image display area 52 and a magnitude of the motion vector. The motion vector and the magnitude of the motion vector of the object (pixel) 54 displayed on the periphery 53 of the still image display area 52 will hereinafter be described.

If the magnitude of the motion vector of the object 54 included in the periphery 53 of the still image display area is less than a predetermined threshold value, the interpolation frame generating portion 14b of the present invention defines the pixel values of the still image display area 52 and the periphery 53 of the frame #n as interpolation pixel values of a still image display area 62 and a periphery 63 of the interpolation frame #I located at the same spatial position as the still image display area 52 and the periphery 53 of the frame #n. For example, if the object 54 moves in a horizontal direction of a screen, the predetermined threshold value may be set to 50% of the number of pixels across the horizontal width of the still image display area 52. If the number of pixels across the horizontal width of the still image display area 52 is 100, the predetermined threshold value is 50. If the object 54 moves in a vertical direction of the screen, the predetermined threshold value is set to 50% of the number of pixels across the vertical width of the still image display area 52. The predetermined threshold value can be set arbitrarily.

When the size of the still image display area 52 is comparatively small, if the object 54 does not comparatively move relative to the still image display area 52, the same image as that of the still image display area 52 and the periphery 53 of the frame #n is displayed in the still image display area 62 and the periphery 63 of the interpolation frame #I (see reference numeral 54 of FIG. 3(C)).

If the magnitude of the motion vector of the object 54 is equal to or greater than the predetermined threshold value, the interpolation frame generating portion 14b defines the pixel values of the still image display area 52' and the periphery 53' of the frame #n+1 as the interpolation pixel values of the still image display area 62 and the periphery 63 of the interpolation frame #I.

Therefore, if the object 54 comparatively moves relative to the still image display area 52, the same image as that of the still image display area 52' and the periphery 53' of the frame #n+1 is displayed in the still image display area 62 and the periphery 63 of the interpolation frame #I (see reference numeral 54' of FIG. 3(C)). Reference numeral 55 of FIG. 3(C) will be described later.

In this way, the disturbance of still image in the still image display area described in FIG. 6 can be prevented in the boundary portion between the still image display area and its periphery.

A size (range) of the periphery (53, 53', 63) of the still image display area (52, 52', 62) can be set arbitrarily. The magnitude of the motion vector of the object 54 may be calculated by reference to not only the magnitude of the motion vector of the object 54 of the frame #n but also an average value of the motion vectors of all the pixels making up the image 51 of the frame #n, for example, and the interpolation pixel values of the interpolation frame #I may be determined based on the magnitude of the motion vector as described above.

Interpolation pixels of image areas other than the still image display area 62 and the periphery 63 of the interpolation frame #I may be generated in accordance with a normal interpolation process.

If a scene changes, the frame interpolation process of the present invention is not executed since image is different before and after the scene change.

Second Embodiment

Telop (still image) may be displayed across a horizontal width of an upper portion of a screen as in the case of flash news, for example. In this case, if the predetermined threshold value is set to 50% of the number of pixels across the horizontal width of the still image display area as described in the first embodiment, it is unthinkable that a magnitude of a motion vector of an object exceeds the predetermined threshold (it is unthinkable that an object moves at high speed from the left end to the right end of the screen between two frames). Therefore, the image of the still image display area 52 and the periphery 53 of the frame #n is always displayed in the still image display area 62 and the periphery 63 of the interpolation frame #I, and the image may not be displayed smoothly.

Figure 4:
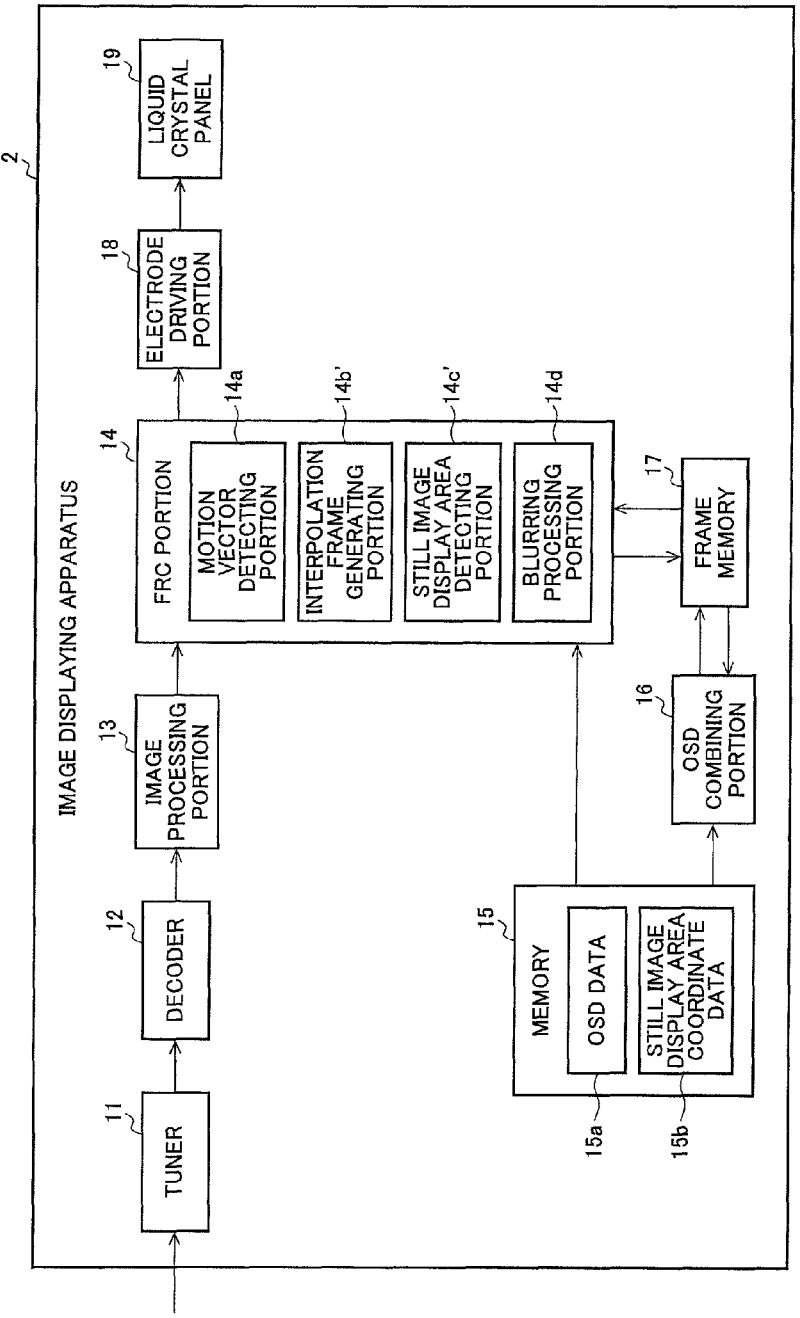
FIG. 4 is a functional block diagram of another image displaying apparatus according to the present invention.

FIG. 4 is a functional block diagram of an image displaying apparatus of a second embodiment and an image displaying apparatus 2 is made up by adding a blurring processing portion 14d to the image displaying apparatus 1 of FIG. 1. Functional blocks of the image displaying apparatus 2 having the same functions as the functional blocks of the image displaying apparatus 1 described with reference to FIG. 1 are denoted by the same reference numerals and will not be described.

If the magnitude of the motion vector of the object 54 included in the periphery 53 of the still image display area 52 is less than a predetermined threshold value, an interpolation frame generating portion 14b' defines the pixel values of the still image display area 52 and the periphery 53 of the frame #n as the interpolation pixel values of the still image display area 62 and the periphery 63 of the interpolation frame #I located at the same spatial position as the still image display area 52 and the periphery 53 of the frame #n. It is assumed that the predetermined threshold value is the same value (number of pixels: 50) as the threshold value described in the first embodiment.

If the magnitude of the motion vector of the object 54 is equal to or greater than the predetermined threshold value, the interpolation frame generating portion 14b' generates the interpolation pixel values of the still image display area 62 and the periphery 63 of the interpolation frame #I based on the magnitude of the motion vector.

Specifically, as described in FIG. 2, the interpolation frame generating portion 14b' may calculate an average value between a pixel value of a pixel (see the pixel $P_x$ of FIG. 2) of the still image display area 52 and the periphery 53 of the frame #n and a pixel value of a pixel (see the pixel $P_{x+1}$ of FIG. 2) of the still image display area 52' and the periphery 53' of the frame #n+1 to calculate (generate) a pixel value of an interpolation pixel (see the interpolation pixel $P_i$ of FIG. 2) of the still image display area 62 and the periphery 63 of the interpolation frame #I. In this case, the object 54 is displayed as indicated by the object 55 of FIG. 3(C).

If the interpolation pixel value is calculated in this way, as described with reference to FIG. 6, a portion of the still image displayed in the still image display area 52 of the frame #n is displayed above a moving object and the image of the still image display area 62 of the interpolation frame #I may deteriorate.

Therefore, the blurring processing portion 14d of the FRC portion 14 executes a process of blurring the image (interpolation pixel) of the still image display area 62 and the periphery 63 of the interpolation frame #I. The blurring process may be executed by performing a 3×3 filter operation, performing a 3×1 filter operation, or performing a typical median filter operation, etc., for the interpolation pixel values of the still image display area 62 and the periphery 63

The blurring process executed by the blurring processing portion 14d will be described with reference to FIG. 5.

Figure 3:
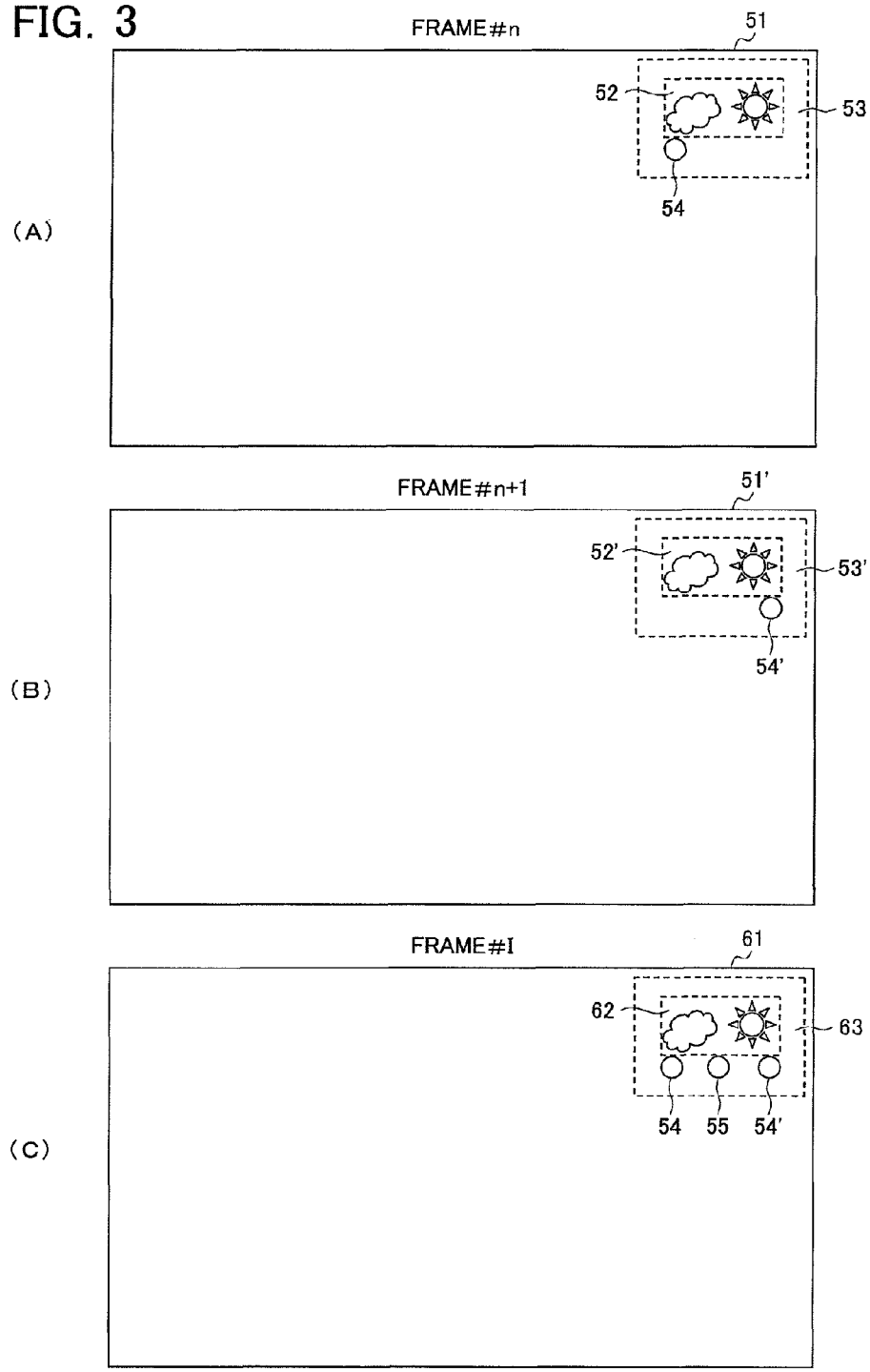
FIG. 3 is a diagram for explaining an interpolation frame generating process of the present invention.
Figure 5:
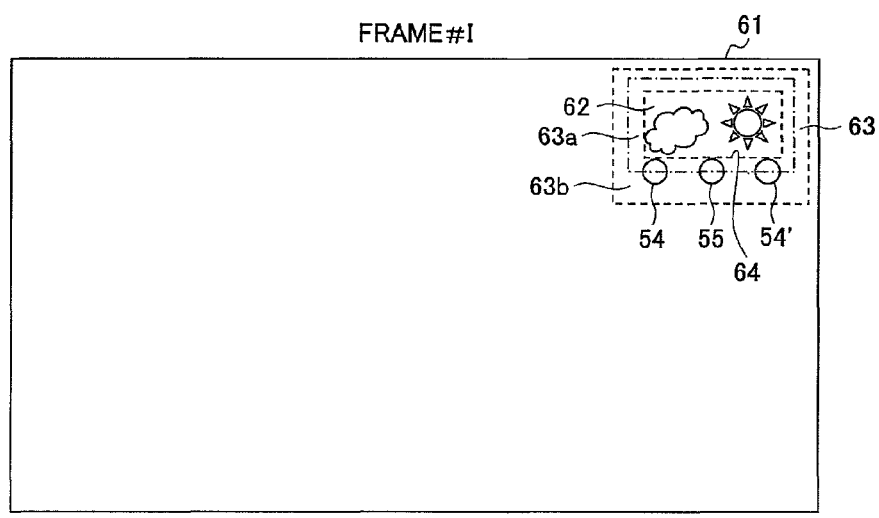
FIG. 5 is a diagram for explaining a blurring process.

FIG. 5 depicts an interpolation frame #I between the frame #n (see FIG. 3(A)) and the frame #n+1 (see FIG. 3(B)) described in FIG. 3, corresponding to the interpolation frame #I of FIG. 3(C).

The periphery 63 of the still image display area 62 is sectioned into a first peripheral 63a and a second peripheral 63b for the convenience of description.

The blurring processing portion 14d executes a process of blurring the image of the still image display area 62 at a predetermined blur amount and blurring the image of the peripheral 63 at a smaller blur amount than the predetermined blur amount as the distance from the still image display area 62 becomes large. Specifically, the blurring processing portion 14d performs a 5-tap filter (1, 1, 1, 1, 1)×⅕ operation for pixels (interpolation pixels) of the still image display area 62, performs a 3-tap filter (1, 1, 1)×⅓ operation for pixels (interpolation pixels) of the first peripheral 63a, and performs a 3-tap filter (1, 2, 1)×¼ operation for pixels (interpolation pixels) of the second peripheral 63b. The 5-tap filter (1, 1, 1, 1, 1)×⅕ operation may be performed for pixels near a boundary portion 64 instead of the entire still image display area 62.

The FRC portion 14 then sequentially outputs the frame #n, the interpolation frame #I, the frame #n+1 of the frame memory 17 to the electrode driving portion 18 to display image on the liquid crystal panel 19.

By generating an interpolation frame in this way, image is smoothly displayed and, if the image deteriorates due to this interpolation frame, the image deterioration can be made noticeable by blurring the image and, therefore, a viewer can view the image comfortably.

Although the still image of the frame #n (without blur) →the still image of the interpolation frame #I (with blur) →the still image of the frame #n+1 (without blur) are sequentially displayed in the still image display area, since the image without blur and the image with blur are integrated and this image is clearly visible to the human eye, the displayed image causes no sense of strangeness. When a repeated frame of image signal of the 2-3 pull-down mode is replaced with an interpolation frame to increase a frame rate, if only the image of the interpolation frame #I is blurred, the still image of frame #n (without blur)→four interpolation frames #I (with blur) are displayed and likely to cause a sense of strangeness and, therefore, the still image of the frame #n is preferably blurred as well.

Additionally, if the magnitude of the motion vector of the object 54 is equal to or greater than the predetermined threshold value, the interpolation frame generating portion 14b' may generate the interpolation pixels of the still image display area 62 and the periphery 63 by calculating the pixel values of the interpolation pixels of the still image display area 62 and the periphery 63 of the interpolation frame #I with the following equation:

$$P_i = (1-k) \times P_x + k \times P_{x+1} \quad \text{(Eq. 1)}$$

where $P_i$ is a pixel value of an interpolation pixel of the still image display area 62 and the periphery 63 of the interpolation frame #I, $P_x$ is a pixel value of a pixel of the still image display area 52 and the periphery 53 of the frame #n, and $P_{x+1}$ is a pixel value of a pixel of the still image display area 52' and the periphery 53' of the frame #n+1.

For example, when the object 54 moves on a screen horizontally, k denotes a ratio of the magnitude (number of pixels of movement) of the motion vector of the object 54 to the number of pixels across the horizontal width of the still image display area 52. For example, assuming that the magnitude of the motion vector of the object 54 is 10 when the number of pixels across the horizontal width of the still image display area 52 is 100 as described above, k is the magnitude of the motion vector of the object 54 (10)/the number of pixels across the horizontal width of the still image display area 52 (100)=0.1.

As described above, the interpolation frame generating portion 14b' may determine a value of k based on not only the motion vector of the object 54 but also an average value of the motion vectors of all the pixels making up the image 51 of the frame #n. As described above, a value of k can be determined in consideration of various factors.

EXPLANATION OF REFERENCE NUMERALS 1, 2 . . . image displaying apparatus; 11 . . . tuner; 12 . . . decoder; 13 . . . image processing portion; 14 . . . FRC portion; 14a . . . motion vector detecting portion; 14b, 14b' . . . interpolation frame generating portion; 14c, 14c' . . . still image display area detecting portion; 14d . . . blurring processing portion; 15 . . . memory; 15a . . . OSD data; 15b . . . still image display area coordinate data; 16 . . . OSD combining portion; 17 . . . frame memory; 18 . . . electrode driving portion; 19 . . . liquid crystal panel; 51, 51', 61, 101, 101', 111 . . . image; 52, 52', 62, 102, 102', 112 . . . still image display area; 53, 53', 63, 103, 103', 113 . . . periphery of still image display area; 54, 54', 55, 104, 104', 114 . . . object; 63a . . . first periphery; 63b . . . second periphery; and 64 . . . boundary portion.

The invention claimed is:

1. An image displaying apparatus having a motion vector detecting portion detecting a motion vector from a difference between a first image frame and a second image frame sequentially input and an interpolation frame generating portion generating an interpolation frame inserted between the first image frame and the second image frame based on the detected motion vector, the apparatus comprising: a still image display area detecting portion that detects an area displaying a predetermined still image in the first image frame and the second image frame, the interpolation frame generating portion defining pixel values of a still image display area and its periphery of the first image frame as interpolation pixel values of a still image display area and its periphery of the interpolation frame if a magnitude of the motion vector on the periphery of the still image display area detected by the motion vector detecting portion is less than a predetermined threshold value, the interpolation frame generating portion defining pixel values of a still image display area and its periphery of the second image frame as the interpolation pixel values of the still image display area and its periphery of the interpolation frame if the magnitude of the motion vector is equal to or greater than the predetermined threshold value.

2. The image displaying apparatus as defined in claim 1, wherein if the magnitude of the motion vector on the periphery of the still image display area detected by the motion vector detecting portion is less than a predetermined threshold value, the interpolation frame generating portion defines the pixel values of the still image display area and its periphery of the first image frame as the interpolation pixel values of the still image display area and its periphery of the interpolation frame, and wherein if the magnitude of the motion vector is equal to or greater than the predetermined threshold value, the interpolation frame generating portion generates the interpolation pixel values of the still image display area and its periphery of the interpolation frame based on the magnitude of the motion vector and blurs the interpolation pixels.

* * * * *